(12) United States Patent
Zaklika et al.

(10) Patent No.: US 7,006,688 B2
(45) Date of Patent: Feb. 28, 2006

(54) HISTOGRAM ADJUSTMENT FEATURES FOR USE IN IMAGING TECHNOLOGIES

(75) Inventors: Kryzstof Antoni Zaklika, Saint Paul, MN (US); Mikhail Ivanovich Trifonov, Leningrad Region (RU); Olga Vadimovna Sharonova, Saint Petersburg (RU)

(73) Assignee: Corel Corporation, Ottawa (CA)

( * ) Notice: Subject to any disclaimer, the term of this patent is extended or adjusted under 35 U.S.C. 154(b) by 805 days.

(21) Appl. No.: 09/899,577

(22) Filed: Jul. 5, 2001

(65) Prior Publication Data

US 2003/0012437 A1 Jan. 16, 2003

(51) Int. Cl.
*G06K 9/00* (2006.01)

(52) U.S. Cl. ....................... 382/165; 382/169
(58) Field of Classification Search ......... 382/162–172; 358/518–523
See application file for complete search history.

(56) References Cited

U.S. PATENT DOCUMENTS

| | | | | |
|---|---|---|---|---|
| 5,146,346 A | * | 9/1992 | Knoll ......................... | 382/167 |
| 5,412,773 A | * | 5/1995 | Carlucci et al. ............. | 345/723 |
| 5,579,402 A | | 11/1996 | Hayen ........................ | 382/132 |
| 5,724,456 A | * | 3/1998 | Boyack et al. .............. | 382/274 |
| 5,828,793 A | | 10/1998 | Mann ......................... | 382/284 |
| 5,874,988 A | * | 2/1999 | Gu ............................. | 348/97 |
| 6,061,091 A | | 5/2000 | Van de Poel et al. ....... | 348/241 |
| 6,204,940 B1 | | 3/2001 | Lin et al. .................... | 358/527 |
| 6,219,129 B1 | | 4/2001 | Kinjo et al. ................. | 355/40 |
| 6,229,624 B1 | * | 5/2001 | Gilman et al. .............. | 358/1.9 |
| 6,266,103 B1 | * | 7/2001 | Barton et al. ............... | 348/675 |
| 6,281,895 B1 | * | 8/2001 | Jeong ......................... | 345/810 |
| 6,462,835 B1 | * | 10/2002 | Loushin et al. ............. | 358/1.9 |
| 6,504,954 B1 | * | 1/2003 | Goldstein ................... | 382/168 |
| 6,741,262 B1 | * | 5/2004 | Munson et al. ............. | 345/594 |

OTHER PUBLICATIONS

Duch, W., et al., "Bi–Radial Transfer Functions" *Proceedings of the Second Conference on Neural Networks and Their Applications* May 1996; 131–137.

Duch, W., et al., "Bi–Radical Transfer Functions," *Technical Report UMK–KMK–TR* Jan. 1996, Department of Computer Methods, Nicolas Copemicus University, Toruñ, Poland, 1995.

Braun, G. J., et al., "Image Lightness Rescaling Using Sigmoidal Contrast Enhancement Functions," *Journal of Electronic Imaging* vol. 8(4), Oct. 1999; 380–393.

Braun, G. J., et al., "image Lightness Rescaling Using Sigmoidal Contrast Enhancement Functions," *IS & T SPIE Electronic Imaging '99, Color Imaging: Device Independent Color, Color Hardcopy, and Graphic Arts IV*, vol. 3648 (0277–786X) Jan. 1999; 96–105.

Braun, G. J., et al. "Gamut Mapping for Pictorial Images," *TAGA Proceedings* 1999; 645–660.

* cited by examiner

*Primary Examiner*—Jingge Wu
(74) *Attorney, Agent, or Firm*—Hensley, Kim & Edgington LLC

(57) ABSTRACT

A computer with a monitor viewable program executes to display a histogram of image data on the monitor. The monitor contemporaneously displays a screen image viewed on a monitor of the histogram, and displays a digital or analog control element that controls both compression and expansion of midtones. Activation of the midtone compression/expansion element alters the displayed image according to effects of programs underlying the control of the element. This histogram display and element are associated on a single logical screen display in which at least one other image data modification effect is present on the screen image as an addressable image data modification effect.

24 Claims, 3 Drawing Sheets

HISTOGRAM ADJUSTMENT FEATURES FOR USE IN IMAGING TECHNOLOGIES

BACKGROUND OF THE INVENTION

1. Field of the Invention

The present invention relates to the field of imaging technology, correction or adjustment of images and image data, the adjustment of image properties, and the use of look-up-tables and sliders on view screens to systematically adjust the visual properties of images and image data.

2. Background of the Art

Images and image data can be represented in many different terms and in many different scientific formats, and many different types of properties can be used to assist in defining the image and the components of the image. A basic point or component in defining an image is known in the art as a pixel, the pixel being the smallest unit of information used to construct or define an image or the properties of an image. A pixel, depending upon the method in which the image is rendered, may vary in absolute size or proportions to the image, and the pixel itself may be composed of smaller units that need not be defined in the image data formatting system that is used to store the image data. For a particular example of this, an image rendered on a laser imaging system may have the data expressed in terms of pixels, but the physical process of writing or printing an image requires that the laser imager address a number of spots to create the pixel. The shape of the pixels may also be defined and preselected, for example, by designing an ordering of spots (number of spots, arrangement of spots, spacing of spots, vacant area between spots, distribution or gradation of spots as a function of density and color, and any other elements that relate to how spots are used to construct a pixel. The pixel, however, remains the basic building block of the image, and remains the basic building block of image data.

Each pixel may be defined by a range of properties, and groups of pixels may also be defined by their individual properties and their properties in relationship to the properties of other pixels. In the different options that are available for the definition of the properties of pixels, many of the terms used in defining the properties are related to each other, overlap each other or are the same name, although used in the different definition systems. For example, properties defined by such as terms as brightness, lightness, darkness, density, optical density, maximum density, minimum density, hue, chroma, saturation, contrast, luminosity, tone, gamma, contrast, tristimulus values, $C^*I^*e^*$, $L^*a^*b^*$, and spectra are examples of the many specific or general terms that are used within the imaging art. These terms are used, sometimes in association with general or specific mathematical terms or systems to define an image, define the pixels, and define the components of the image.

The advent of digital imaging, and more particularly the ability to store, access and print images has greatly enhanced the ability of hardware, software and apparatus to adjust the content of images and image data by addressing the properties of individual pixels and collections of pixels.

With the advent of digital reproduction machines, the copy process for making a permanent record of an image has changed. In a digital process, a document or image is scanned by a digital scanner to convert the light reflected from the document into storable data representing the light intensity from predetermined areas (pixels) of the document. These data, after suitable processing, are converted into image signals or pixels of image data to be used by the digital reproduction machine to recreate the scanned image. The pixels of image data are processed by an image processing system which converts the pixels of image data into signals which can be utilized by a printing device to recreate the scanned image. This printing device may be either a xerographic printer, ink jet printer, thermal printer, laser printer, video monitor, or any other type of printing device that is capable of converting digital data into a mark on a recording medium.

As with the light-lens systems, the quality of a reproduction machine is still a function of how well the copy matches the original. However, in this digital environment, other factors can now contribute to or impact the quality of the reproduced image. For example, the scanner can impact the quality if the scanner is not properly calibrated. Also, the output (printing) device can impact the quality if a printhead is clogged or a photoreceptor is not properly cleaned. But, the aspect of the digital system which can have the greatest impact is the digital (image) processing of the image data because a digital machine must convert light to a digital signal and then convert the digital signal to a mark on a recording medium. In other words, the image processing system provides the transfer function between the light reflected from the document to the mark on the recording medium.

Quality can be measured in many different ways. One way is to look at the characteristics of the reproduced image. An example of such a characteristic for determining the quality of the reproduced image is the contrast of the image. The contrast of an imaged (copied) document is the most commonly used characteristic for measuring quality since contrast provides a good overall assessment of the image's quality.

In a digital reproduction machine, the image processing system can greatly impact the contrast of the image. Thus, to assure high quality at the output printing device, it is desirable to know the contrast of the image being scanned prior to the image processing stage because, with this knowledge, the image processing system can process the image data so that the reproduced image has the proper contrast. One way of obtaining this contrast information prior to digital image processing is for the digital reproduction machine to generate a gray level histogram, which gives an easy to read measure of the image contrast. The image or gray level histogram describes the statistical distribution of gray levels of an image in terms of the number of pixels at each gray level.

A histogram can be represented graphically with a range of intensity on the horizontal axis (e.g., from 0 to 255, if an eight-bit per pixel sampling resolution is utilized), and the number of pixels on the vertical axis. Using this graphical representation, a histogram can illustrate whether an image is basically dark or light and high or low contrast, and what the distribution of data are within the image. It is important to know that when an image is represented by histogram, all spatial information is lost. The histogram specifies the number of pixels of each gray level but gives no indication where these pixels are located in the image. In other words, very different images may have very similar histograms.

Conventionally, when creating a histogram of the scanned image, a digital reproduction system samples a document, collects intensity data from the document, and uses this information to determine the document's background value. In such conventional systems, the computed background value of the document represents the average intensity of the document.

Histograms of low contrast images appear as narrow distributions that do not span the full tone range. Excessively dark images have histograms with large peaks in regions of low intensity and excessively bright images have large peaks in regions of high intensity. Histograms of images with proper contrast have a distribution spanning the full tone range, which is proportional to the amounts of objects of various brightness in the original scene from which the image was derived.

Enhancement of an image (to correct for image degradations such as under or over-exposure, poor lighting, printer preferences, etc.) can be achieved by modifying the histogram of an image. This "contrast enhancement", is often made up of a combination of two linear transformations known as histogram slide and histogram stretch. These operations, based on an image's contrast and dynamic range characteristics, redistribute the histogram so that contrast and dynamic range may be enhanced. The objective of contrast enhancement is to utilize the full dynamic range to reveal the intensity variations (details) within the image that may not be visible until after the transformation.

The histogram sliding operation is simply the addition or subtraction of a constant intensity level to all pixels in the image. Doing this to every pixel effectively slides the entire input image histogram to the right or left. The basic effect of histogram sliding is a lightening or darkening of the image. Since the resulting histogram is only shifted, the contrast of the output image will be identical to that of the input image. The linear transformation or tone reproduction curve (TRC) map for a sliding operation has been a 45 degree line (this is why the image contrast is maintained). For a slide of zero, the line would pass through the origin. For a positive slide (>0), the line will touch the vertical axis (output intensity) passing through the origin. For a negative slide, the line will touch the horizontal axis (input intensity) passing through the origin. A positive slide effectively lightens an image, while a negative slide darkens an image.

Histogram stretching is the multiplication of all pixels in the image by a constant value. For example, a histogram, with all the pixels residing in the lower half of the gray scale range, will spread out to occupy the entire gray scale range when multiplied by a constant of two (2). This stretching operation expands or reduces the contrast and dynamic range of an image. The TRC map will always be a straight line passing through the origin. For the case of a stretch of one (1), the line would be at a 45 degree angle. In general, contrast enhancement is carried out in conjunction with histogram sliding.

Typically, in a scanner, the histogram of an image is determined from a prescan. The minimum and maximum reflectance (or intensity) of the image area scanned, ($R_{min}$ and $R_{max}$) respectively, are determined from this scan. The gray scale transformation of shifting and stretching the gray scale to occupy the entire dynamic range is simply a mapping function from the input gray scale into a transformed output gray scale. This is normally accomplished with a look-up table. The "classic" method of dynamic range modification effectively shifts the input gray scale by $R_{min}$ and then stretches the input dynamic range ($R_{min}$ to $R_{max}$) to the available output dynamic range. $R_{max}$ is the image reflectance value such that the sum of the image area which contains reflectances above $R_{max}$ is less than a prescribed percentage of the total image area, and $R_{min}$ is the image reflectance value such that the sum of the image area which contains reflectances below $R_{min}$ is less than a prescribed percentage of the total image area. For example, the percentage can be around three percent. Defining $R_{min}$ and $R_{min}$, allows a greater "range" to stretch the rest of the grey levels. However, this definition of $R_{max}$ and $R_{min}$ instead of the absolute minimum and maximum reflectance values within an image will cause equations and histograms defining the image data to effectively compress the gray level ranges by saturating them. This is usually tolerable, though, because, since by definition, very few pixels have gray levels in these ranges, hence, little image information should be lost.

In "Techniques for Image Processing and Classification in Remote Sensing," by Robert A. Schowengerdt, Academic Press, 1983, it was contended that if the image histogram is asymmetric, it is impossible to simultaneously control the average gray level of the output image and the amount of saturation at the ends of the histogram with a simple linear transformation. The article suggests a two (or more) segment piecewise linear transformation, to make better use of the available gray level range. One would need to manually determine a series of linear steps designed to expand the individual intensity ranges in which the data fall to fill the available dynamic range. Thus, one could designate a series of $R_{min}$ and $R_{max}$ values and use various contrast enhancing, stretching, sliding, mapping or transforming equations, within each region. An improvement in the automation of this process and defining the boundaries of these segments in the TRC map relates to the present invention.

U.S. Pat. No. 6,236,751 describes an image desired to be reproduced is scanned to determine its video pixel gray values. A histogram generator generates a histogram distribution representing a frequency of the gray values. The histogram distribution is analyzed to determine minimum and maximum input gray values that define input boundaries. A segment point is computed between the input boundaries based on the histogram data. The segment point defines a plurality of input segments between the input boundaries. A dynamic output range is selected. Each input segment is mapped to an output segment based on a linear transformation for the corresponding segment. In this manner, a tone reproduction curve map having a piecewise linear transformation is automatically generated from the image histogram data.

U.S. Pat. No. 6,204,940 describes a process and apparatus to improve the digital processing of scanned negative films by reducing the amount of time necessary to perform the process and by increasing the robustness and quality of the images produced. These benefits are achieved by a process of color inversion, white point and black point mapping, and midtone adjustment. White and black mapping increases the dynamic range of the image, as well as removes the color cast of the negative film. A backlit image post-processing algorithm can be employed which uses heuristics to identify back-lighted situations, which are then brightened using a nonlinear power mapping. A midtone adjustment can include the sub-steps of contrast reduction and color adjustment. Contrast reduction reverses the film exposure characteristics. Color adjustment removes the remaining color cast in the midtone region of the image, and obtains the correct brightness. Starting from images with poor contrast and color cast, the system automatically looks for the appropriate correction parameters to produce images with vivid color and good contrast. This is achieved without rescanning or retaking the picture. One implementation, using one-dimensional look-up-tables, is very efficient.

U.S. Pat. No. 5,579,402 describes creating a histogram of an image signal matrix, representative of a radiographic image obtained by scanning a stimulable phosphor sheet carrying a radiation image with stimulating rays, detecting the light emitted after stimulation and converting the detected light into electrical image signals, can be achieved by creating a histogram of an image signal matrix by means of only a fraction of the image pixels comprised in the image signal matrix, the fraction being determined on the basis of statistical pixel sampling.

The correction of image data on a PC or networked computer can be complex, even though the process has improved significantly over the years. A number of process have been provided in software associated with imaging programs, and many separate functions have been provided. These changes are usually enabled with a screen viewable function, sometimes associated with visual images of graphic representation of data corresponding to the image data (e.g., a histogram, a D v loge curve, etc.). The screen viewable function could be, for example, luminosity, gamma, hue, tone, output/input range, etc. For example, a histogram may be displayed with a program to edit luminosity. Other common terms for luminosity include lightness, value, luminance, tone or brightness. The output maximum and output minimum may be adjusted (e.g., range compression) or the clipping limits may be adjusted (e.g., histogram stretching) and the effect of those changes is displayed on the displayed histogram. The contrast (gamma) may also be indicated by means of a numeric value or as a tone reproduction curve, for instance as a tone reproduction curve superimposed on or adjacent to the histogram. However, certain image data correction functions have never been combined on a single screen, and correction of certain features, such as the ability to alter mid-tones in a displayed histogram have been very complex. For example, histogram curves have been corrected by using a PC displayed cursor to grab various portions of the tone reproduction curve, move those various 'grabbed' portions of the curve (also shifting other portions of the curve with it), and thus manually adjusting the entire curve. It takes a very sophisticated and well-versed graphics expert to appreciate the nature of the effects brought on by the changes, and to envision the effects on the final image. Additionally, it is difficult for the ordinary operator to visualize the effect of combinations of different data modification programs on a single set of image data.

A commercial product for the review of assay data prior to printing out the data was originally distributed by Molecular Dynamics, 928 East Arques Avenue, Sunnyvale, Calif. as "ImageQuant 5.0." This software program accesses an image of a series of assay stripes and displays the composite side-by-side assays on a preview screen. A set of sliders is provided to adjust the slope/bend in conjunction with a slider for altering brightness. This type of adjustment is uniquely directed and of interest in the apparatus to the review of chemical assays, which are visual representations of data, as the data is read in terms of contrast and differences of the stripes. The capability of the system is not directed to improving the quality or characteristics of the image, but directed towards an ability to read and emphasize visual representations of data.

SUMMARY OF THE INVENTION

A viewable program is provided by software that displays a histogram of image data, a screen image viewed on a monitor displays the histogram, an analog (e.g., slider) or digital (e.g., numerical, spin control or step function click spots) control element that controls compression and expansion of midtones and wherein activation of the midtone compression/expansion element accordingly alters the displayed histogram according to effects of programs underlying the movement of the element, this histogram display and element being associated on a single screen display with at least one other image data modification effect (e.g., clipping, lightness adjustment, access to multiple look-up table functions, contrast (gamma) adjustments). Effects on the histogram (that result from changes in the image data) by implementing the various programs, and especially the midtone correction program, are simultaneously incorporated into the histogram image or an associated tone reproduction curve displayed.

DETAILED DESCRIPTION OF THE INVENTION

A video monitor viewable program is provided by software that displays 1) a screen image viewed on a monitor displaying a histogram of image data, 2) an analog (e.g., slider) or digital (e.g., numerical, spin control or step function click spots) control element that controls compression and expansion of midtones and wherein activation of the midtone compression/expansion element accordingly alters the displayed histogram or tone reproduction curve according to effects of programs underlying the movement of the element, the histogram display and tone reproduction curve and element being associated on a single screen display in which 3) at least one other image data modification control that can effect the histogram (e.g., clipping, lightness adjustment, access to multiple look-up table functions, contrast (gamma) adjustments) is also available on the displayed screen. Effects on the image data effected by this procedure are displayed on the histogram along with the results of implementation of the various programs, and especially the midtone correction program, which are simultaneously displayed on the histogram image displayed, for example as a tone reproduction curve.

The term image data as used in the practice of the present invention relates to digital data representing an acquired image, and is used to exclude mere visual representations of data such as images of graphs, images of assays, images of charts, D v logE strips, liquid chromatography strips, pH strips, and the like. The image data more characteristically includes data of real or artificial images of persons, animals, flora, scenery, stellar scenes, weather events, thermal events, rooms, dwellings, vehicles, microscopic scenes and events, cartoon figures, and the like.

To assist in the appreciation of the present invention, certain concepts and definitions should be understood.

$X_{min}$, $Y_{min}$—the minimum value of a color channel. X refers to input (i.e. original), Y refers to output (i.e., new). Normally these are the same, for example zero.

$X_{max}$, $Y_{max}$—the maximum value of a color channel. X refers to input (i.e., original), Y refers to output (i.e., new). Normally these are the same. For example, it is convenient but not essential to use $2^8-1=255$, i.e., an 8-bit color or brightness channel.

X, Y—an arbitrary input channel value and its associated output value

T—a threshold value in color channel units

Figure 2:
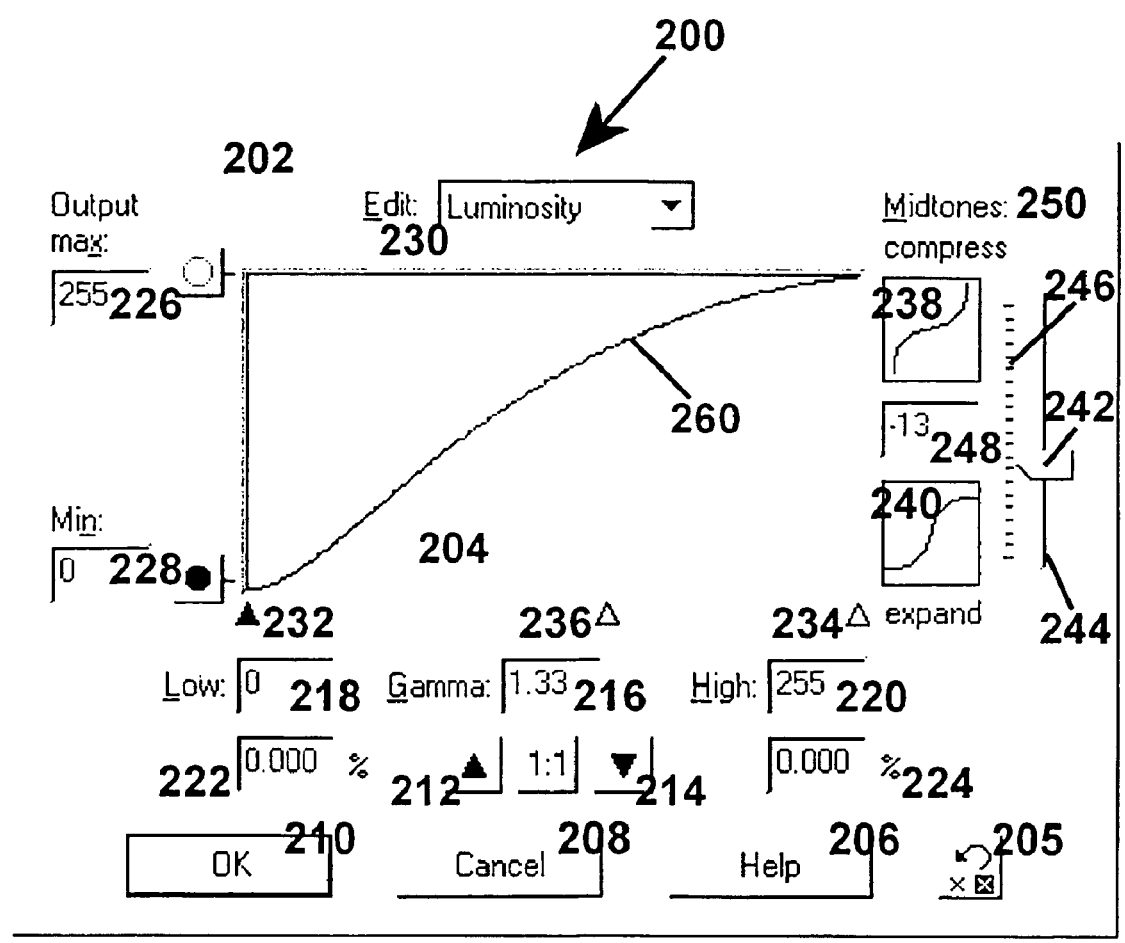
FIG. 2 shows a screen display in accordance with the present invention, including a slide correction for midtone control with displayed curves showing the effect of slide movement on shifting a displayed histogram.

LUT—look-up table, which tabulates desired output channel values for all possible input channel values, so that manipulation of the image consists of using the current (input) channel value as an index into the table to retrieve the new (output) value and placing it into the output channel When this system is implemented, it is possible for the user to open up a histogram of an image (image data), view the monitor display of the histogram, make the automated compression/expansion of the midtone curve, and combine that functional change with other adjustments in the image data, such as clipping limits, contrast, and the like. Reference to FIG. 2 will assist in an appreciation of this aspect of the invention.

FIG. 2 shows a screen image 200 of an active screen 202 histogram 204 of an image. Also shown on the active screen 202 are cursor activated features such as a button to reset program defaults 205, a Help button 206, Cancel button 208, and OK button 210. Also shown on the active screen 202 are a histogram magnification button 212, a histogram size reduction button 214 (with between them a button to reset the histogram magnification), a gamma value indicator 216, a Low (minimum density) clip limit indicator 218, a High (maximum density) clip limit indicator 220, and their respective percentage values 222, 224 and their corresponding Output maximum 226 and Output minimum 228 channel value controls and indicators. The Edit function indicator 230 is set on Luminosity. Also shown are clipping limit slider controls 232 (minimum) and 234 (maximum) and gamma adjustment slider control indicator 236. On the right side of the screen are shown midtone correction program controls 250. The midtone correction program controls 250 comprise a midtone compression curve display 238, a midtone expansion curve display 240, a midtone numeric indicator 248, a slide control 242, an image of a slide path 244 and a scholastic scale 246 for the midtone adjustment. An operator controlled cursor (not shown) would virtually contact the slide control 242, grab the slide control 242, move the slide control 242 upwards to correct the midtones by compression or downwards to correct the midtones by expansion. The movement of the slide would engage a midtone correction algorithm or function, the effects of which would subsequently operate on the image and on the histogram 204. Changes to any of the controls affecting the image and its histogram, such as clip limit controls 232 and 234, the gamma adjustment control 236, the minimum and maximum output value controls 226 and 228, and the midtone correction program controls 250 are represented by the tone reproduction curve 260 superimposed on the image histogram 204. The tone reproduction curve 260 is updated dynamically in response to changes in any of the aforementioned controls. Controls in dialog 220 may be selected and modified by means of a cursor (not shown), for example controlled by a pointing device such as a mouse, light pen, puck, graphic tablet pen, trackball, touch screen, touch panel, and the like. Additionally or alternatively, the controls may be selected and modified with keyboard keys, for example by means of accelerator keys (e.g., "E" for "Edit") associated with specific controls, or by tabbing from control to control, or by means of the spacebar key, carriage return key, arrow keys, function keys and the like, optionally including provision for direct numeric entry of desired control values.

When operated, this midtone control can:

1. Process the luminance of the image (calculated from a combination of the RGB channels for a color image, for example as a weighted or unweighted linear combination, or using the brightness values directly for a grayscale image).
2. Process the color channels of an image either individually or by making independent changes to all three at once.
3. Clip low intensities (i.e. convert all channel values below a threshold T to the value $Y_{min}$ so that the remaining values lie from T to $X_{max}$ and then linearly stretch these latter values to the interval $X_{min}$ to $X_{max}$). The stretching is accomplished, for example only, with $$Y = \begin{cases} Y_{\min}, X < T. \\ Y_{\min} + (Y_{\max} - Y_{\min})(X - T)/(X_{\max} - T). \end{cases}$$

4. Clip high intensities (i.e., convert all channel values above a threshold T to $Y_{max}$ so that the remaining values lie from $X_{min}$ to T and then linearly stretch these latter values to the interval $X_{min}$ to $X_{max}$). The stretching is accomplished, for example only, with $$Y = \begin{cases} Y_{\max}, X > T. \\ Y_{\max} - (Y_{\max} - Y_{\min})(T - X)/(T - X_{\min}). \end{cases}$$

5. Adjust the balance between light and dark areas of the image by gamma adjustment as described in detail below.
6. Compress or expand the midtones of the region as described in detail below.
7. Restrict the range of channel values in the result image to a certain range by setting the lower limit of the range, or the upper limit of the range, or both.

This is accomplished, for example only, with $$Y = Y_{lower} + (Y_{upper} - Y_{lower})(X - X_{min})/(X_{max} - X_{min})$$

8. Display the histogram of the image.
9. Display a tone reproduction curve that represents the transformation that will be applied to the channel values of the image (which, for example, is done by constructing a LUT from this tone reproduction curve).
10. Magnify the histogram to allow detail to be viewed more easily and restore the histogram to normal size.
11. Provide a view of the original image and a preview of the changes that would be applied to the image.
12. Provide a means to apply the change to an image or cancel the operation.
13. Provide explanatory information.
14. Remember previous settings from the last use of the dialog.
15. Restore either the previous settings or default settings.

Note that, though individual equations are given for items 3, 4 and 7, these can all be folded into a single equation. Additionally, there is an unlimited supply of functions, algorithms, and formulae that exist or may be generated to replace the merely exemplary formulae, algorithms or functions, and the invention should not be considered as limited by the number of examples or specific examples given. This result can also be folded into the items 5 and 6 so that a single equation can be used to construct the LUT.

Figure 3A:
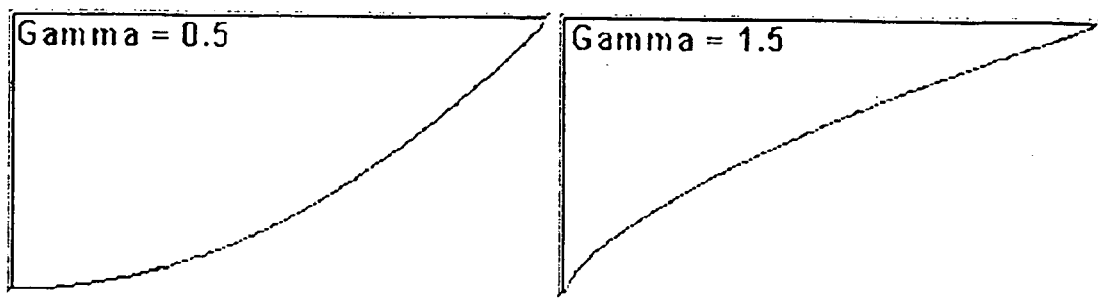
FIG. 3a shows look-up table curves produced by Gamma ($\gamma$) adjustment.

The Gamma (γ) adjustment described above is conventional art and may, for example, be carried out as follows:

$$Y=Y_{max}(X/X_{max})^{1/\gamma}$$

i.e., $1/\gamma$ is an exponent. When $\gamma<1$, then the image is darkened (mean channel value is lowered); when $\gamma>1$ the image is brightened (mean channel value is raised); when $\gamma$ is 1 there is no change. The LUT or tone reproduction curves appear as shown in FIG. 3a.

The term "midtone" is used in various ways within the art. It is sometime referred to in a very specific manner as the middle third of all values in the histogram. That tends to be too limiting in some practices of the invention, so a more general meaning is acceptable, covering a range (usually unsymmetrical) around the mid point or measure of central tendency of the color or brightness distribution represented by the histogram.

The midtone compression is, again for example only, carried out with a tilde function under the constraint that the mean channel value is left unchanged (explained below) using this equation:

$$Y=Y_{max}\exp\{-b[\ln(X_{max}/X)]^p\}$$

Figure 3B:
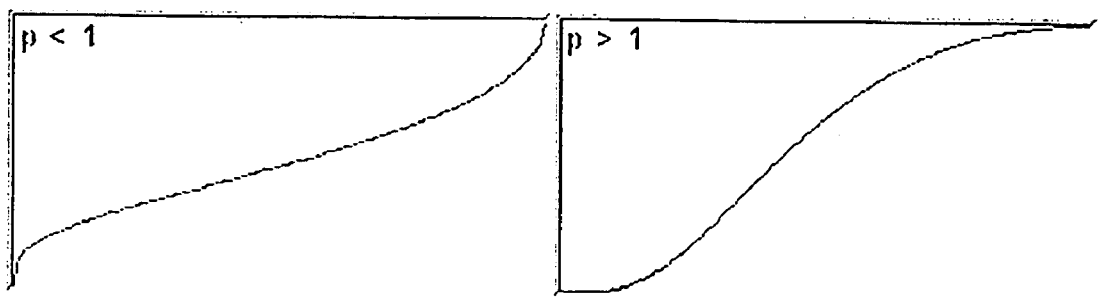
FIG. 3b shows a midtone compression curve that is exponentially based.

Here $\exp(z)$ means $e^z$, where e is the base of natural logarithms, and ln is the natural logarithm. The exponent p controls the shape of the function, as shown in FIG. 3b.

The value p=1 is a special case. In this situation the equation simplifies to $$Y=Y_{max}(X/X_{max})^b$$

so that we have the form of a gamma adjustment function with $\gamma=1/b$ (i.e., the reciprocal of b). After applying the conventional gamma adjustment (and any clipping) the mean value of the input channel, $X_{mean}$, is computed and then the tilde function is applied. The value of b in the function determines the position of the point $X_{mean}$ after application of the tilde function. The value of b is chosen in such a way that $X_{mean}$ remains unchanged after application of the tilde function. This means that b is given by:

$$b=[\ln(X_{max}/X_{mean})]^{1-p}$$

As a result, the complete form of the implementation of the tilde function can be written as:

$$Y=Y_{max}\exp\{-[\ln(X_{max}/X_{mean})]^{1-p}[\ln(X_{max}/X)]^p\}$$

The original reference to the tilde function is A. V. Isaev, "Zakon Razpredeleniya Bogatsva" ("The Law of the Distribution of Wealth"), "LISS" Publishing Company, St. Petersburg, Russia, 1998, Chapter 1, Equation 1.

Under certain conditions, for example where p>1, the tilde function is sigmoidal. In principle, other sigmoidal functions could be used in place of the tilde function. The arctangent and tangent functions are examples, as is an adaptation of the Weibull function, which is used to describe skewed frequency distributions and has the form:

$$Y=1-\exp[-(X/\beta)^\alpha]$$

where $\alpha$ is a shape parameter and $\beta$ is a width or scale parameter for the distribution.

By way of additional, but not exhaustive nor limiting examples of sigmoidal functions that could be adapted for use in the invention, we note:

$$y=1/(1-e^{-x/s})$$

$y=\tanh(x)=(1-e^{-x/s})/(1+e^{-x/s})$ (the hyperbolic tangent function)

$$y=[(1-s^2x^2)-1]/sx$$

$$y=x\,\text{sgn}(x)(x-s)/(x^2-s^2)$$

The last function can be computed only with multiplication and division. In consequence, the calculation is faster than for functions containing exponents or roots.
References to these Sigmoidal Functions are:
  W. Duch and N. Jankowski, "Bi-radial transfer functions", in *Proceedings of the Second Conference on Neural Networks and Their Applications,* Szczyrk, Poland, May 1996, 131–137.
  W. Duch and N. Jankowski, "Bi-radial transfer functions", *Technical Report UMK-KMK-TR* January 1996, Department of Computer Methods, Nicholas Copernicus University, Toru, Poland, 1995.

References to the use of sigmoidal functions for contrast adjustment include: G. J. Braun and M. D. Fairchild, "Image Lightness Rescaling using Sigmoidal Contrast Enhancement Functions", *Journal of Electronic Imaging,* 8, 380–393 (1999).
  G. J. Braun and M. D. Fairchild, "Image Lightness Rescaling using Sigmoidal Contrast Enhancement Functions", *IS&T/SPIE Electronic Imaging '99, Color Imaging: Device Independent Color, Color Hardcopy, and Graphic Arts IV,* San Jose: 96–105 (1999).
  G. J. Braun and M. D. Fairchild, "Gamut Mapping for Pictorial Images", *TAGA Proceedings:* 645–660 (1999).

It is not necessary to use explicit functions to manipulate midtones or contrast. For example, piecewise curves formed by interpolation between points, whether linear or by splines or other means, may also be used provided they are structured to permit both compression and expansion of midtones. Indeed the entire manipulation may be performed with look up tables and no explicit reference to a curve, though it is preferred to provide a visual indication of the resulting tone reproduction curve.

The present invention includes at least a computer (with any formatting, power, or design) with a monitor (e.g., CRT, light emitting diode display, liquid crystal display, plasma display, or any other viewable system, particularly any system in which digital information can be viewed, particularly in color) viewable program (that is the image information produced or treated by the program can be displayed) that executes to display a histogram of image data on the monitor, the monitor contemporaneously displaying a screen image viewed on a monitor displaying the histogram, and displays a digital or analog control element that controls both compression and expansion of midtones, wherein activation of the midtone compression/expansion element accordingly alters the displayed image according to effects of programs underlying the control of the element, this histogram display and element being associated on a single logical screen display in which at least one other image data modification effect is present on the screen image as a cursor addressable or keyboard selectable image data modification effect. The computer with a monitor viewable program (referred to herein as the "system") may have the at least one other image data modification effect included as at least one function selected from the group consisting of clipping, lightness adjustment, output range compression, access to multiple look-up table functions, and contrast adjustments. It is an option to have the system control element comprise a slider that controls both compression and expansion. This control element may comprise a single control that controls both compression and expansion. A useful formatting of the display control screen for the viewable program is wherein adjacent the slider are representations of a midtone expansion curve and a midtone compression curve. The system may display a histogram with an active tone reproduction curve display showing combined effects of midtone corrections and the at least one function.

The system may provide the at least one other image data modification effect as including at least one function selected from the group consisting of clipping, lightness adjustment, output range compression or expansion, access to multiple look-up table functions, and contrast adjustments.

The invention may be described in another aspect as a system for processing of image data comprising a computer that provides data to a video monitor, the data including virtual representations of a dialog on image data including at least one screen image viewed on the monitor that displays a histogram, and displays a digital or analog control element that controls both compression and expansion of midtones, wherein activation of the midtone compression/expansion element accordingly alters the displayed image according to effects of programs underlying the control of the element, this histogram display and element being associated on a single screen display in which at least one other image data modification effect appears on the virtual image and is a cursor addressable or keyboard selectable image data modification effect.

The invention may still further be alternatively described as a computer with a monitor viewable program that executes to display a histogram of image data on the monitor, the monitor contemporaneously displaying a screen image viewed on a monitor that displays the histogram, and displays a digital or analog control element that controls both compression and expansion of midtones, wherein activation of the midtone compression/expansion element accordingly alters the displayed image according to effects of programs underlying the control of the element, this histogram display and element being associated on the monitor display.

An attribute of certain improvements in the practice of the present invention is where effects implemented on the histogram (that is on the image of which the histogram is displayed), including at least the midtone expansion and compression program, are simultaneously incorporated into the image displayed.

The invention may still be further described in another aspect as a computer with a video monitor viewable program provided by software that displays a) a screen image viewed on a monitor displaying a histogram of image data, b) a digital slider and/or analog control element that controls compression and expansion of midtones and wherein activation of the midtone compression/expansion element accordingly alters the displayed image according to effects of programs underlying the movement of the element, the histogram display and element being associated on a single screen display in which c) at least an image data modification control other than midtone compression and expansion that can effect the histogram selected from the group consisting of clipping, output range compression and expansion, access to multiple look-up table functions, and contrast adjustments is also available on the screen display.

A particularly desirable field of practice of the invention includes those fields wherein the image data represents real or artificial images of persons, animals, flora, scenery, stellar scenes, weather events, thermal events, rooms, dwellings, vehicles, microscopic scenes, microscopic events, or cartoon figures. Alternatively, the image data relates to digital images of photographs and web graphics. The luminance of the image is calculated from a combination of the RGB channels for a color image or by using the brightness values directly for a grayscale image. The color channels of the image are processed either individually or by making independent changes to all channels at once. Another feature can include the program acting to clip low intensities. For example, this clipping can be effected by converting all channel values below a threshold T to the value $Y_{min}$ so that the remaining values lie from T to $X_{max}$ and then linearly stretching these latter values to the interval $X_{min}$ to $X_{max}$. Stretching, by way of a non-limiting example, may be accomplished with the algorithm:

$$Y = \begin{cases} Y_{min}, X < T. \\ Y_{min} + (Y_{max} - Y_{min})(X - T)/(X_{max} - T). \end{cases}$$

or wherein clipping of high intensities is effected by the program.

A particularly unique practice of the present invention, as described in greater detail with examples herein is where a tilde function is used for contrast adjustment. Also, gamma function may be used for contrast adjustment. The gamma function, by way of a non-limiting example, may be:

$$Y = Y_{max}(X/X_{max})^{1/\gamma}$$

EXAMPLES

Figure 1:
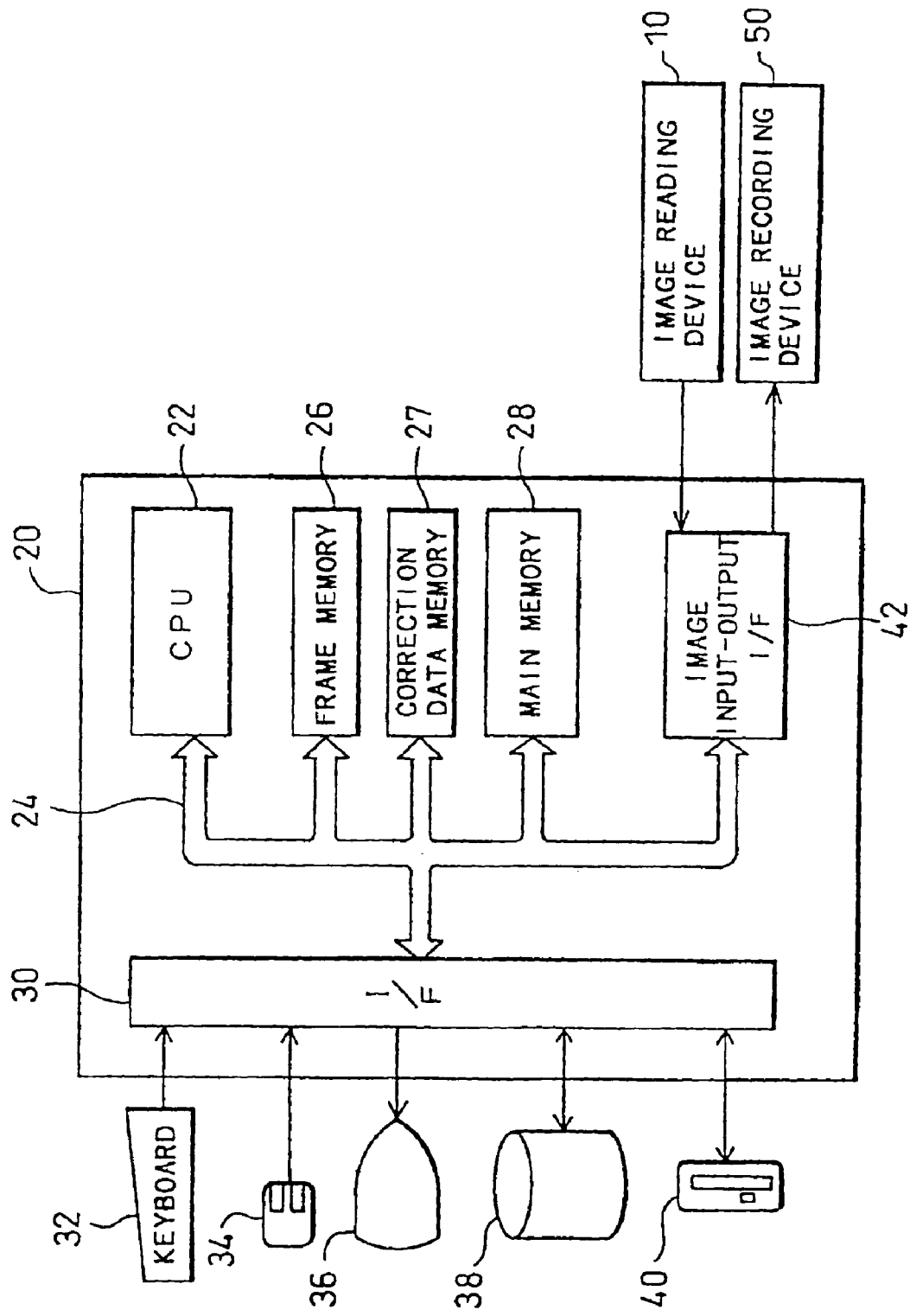
FIG. 1 shows a block diagram of a system that may utilize or embed the apparatus and process of the invention.

FIG. 1 is a block diagram illustrating structure of an image processing system with an apparatus for determining image processing parameters incorporated therein as one embodiment according to the present invention. The image processing system includes an image reading device 10, an image processing apparatus 20, and an image recording device 50. The image reading device 10 is realized, for example, by an input scanner or a digital camera that reads image data of a color image. The image reading device 10 outputs image data (R, G, and B signals) DR, DG, and DB of the respective color components obtained by scanning an image of an original by every pixel. The image reading device 10 may otherwise be realized by a magnetic disk in which image data are stored or a compact disk (CD) or in the form of a network communicated with another device via a communications line.

The image processing apparatus 20 is realized by a computer system, such as a work station or a personal computer. The image processing apparatus 20 may convert the image data (e.g., DR, DG, and DB) input from the image reading device 10 into image recording data (e.g., R, G, B; DY, DM, DC, and DK of Y, M, C, and K). The resulting image data (e.g., DY, DM, DC, and DK or DR, DG and DB) are transmitted to the image recording device 50.

The image recording device 50 is realized, for example, by an imagesetter, video monitor or a color printer that records image data. In the case of the imagesetter, for example, the image recording data DY, DM, DC, and DK output from the image processing apparatus 20 are further converted into halftone image signals. The halftone image signals are recorded on a photosensitive film by ON/OFF modulation of an exposure laser beam, so as to give a color separation film on which images of the respective color components Y, M, C, and K are recorded. The image recording device 50 may otherwise be realized by a magnetic disk or compact disk (CD) or in the form of a network communicated with another device via a communications line. In this case, the image recording data DY, DM, DC, and DK may be recorded or transferred without any further processing.

A CPU 22 of the image processing apparatus 20 is connected with a frame memory 26, a correction data memory 27, and a main memory 28 via a bus 24. A keyboard 32, a mouse 34 functioning as a pointing device, a color CRT 36 functioning as a display unit, and a hard disk drive 38 and a flexible drive 40 for temporarily storing a variety of data are connected to the image processing apparatus 20 via an input-output interface 30. The keyboard 32 and the mouse 34 function as the coordinate point input means for specifying coordinates of a fixed point and a moving point and as the input means for inputting keyword information discussed later. The image processing apparatus 20 is further connected to the image reading device 10 and the image recording device 50 via an image input-output interface 42.

The main memory 28 stores software (applications programs) that realize the respective functional units of the image processing apparatus 20 (more concretely, the functions of the inferring unit, the correction value inferring unit, the correction unit, and the image conversion device of the present invention). The CPU 22 executes the software to realize the functions of the respective units and the device, which have been described previously.

The software realizing the functions of these units and the device is recorded on a computer readable recording medium, such as a floppy disk or a CD-ROM. The computer reads the software from the recording medium and transfers the input software to an internal storage device (for example, the main memory 28) or an external storage device (for example, the hard disk drive 38 or the flexible drive 40). The software may otherwise be supplied to the computer via a communications network. By way of example, the image processing apparatus 20 is connected with a modem, which is further connected to a network including a server via a communications line. The server functions as a program supply device that supplies the software to the image processing apparatus 20 via the communications line.

The CPU 22 executes the computer programs stored in the internal storage device to realize the functions of the computer programs. Alternatively the computer directly reads and executes the computer programs recorded on the recording medium.

What is claimed:

1. A computer with a monitor viewable program that executes to display a histogram of image data on the monitor, the monitor contemporaneously displaying a screen image viewed on a monitor displaying the histogram, and displays a digital or analog control element that controls both compression and expansion of midtones, wherein activation of the midtone compression/expansion element accordingly alters the displayed image according to effects of programs underlying the control of the element, this histogram display and element being associated on a single logical screen display in which at least one other image data modification effect is present on the screen image as a cursor addressable or keyboard selectable image data modification effect, wherein luminance of the image is calculated from a combination of the RGB channels for a color image or by using the brightness values directly for a grayscale image and clipping is effected by converting all channel values below a threshold T to the value Ymin so that the remaining values lie from T to Xmax and then linearly stretching these latter values to the interval Xmin to Xmax.

2. The computer and monitor viewable program of claim 1 wherein the clipping is effected by application of an algorithm to convert all channel values above a threshold T to $Y_{max}$ so that the remaining values lie from $X_{min}$ to T and then linearly stretch these latter values to the interval $X_{min}$ to $X_{max}$.

3. The computer and monitor viewable program of claim 1 wherein the stretching is accomplished with $$Y = \begin{cases} Y_{\max}, X > T. \\ Y_{\max} - (Y_{\max} - Y_{\min})(T - X)/(T - X_{\min}). \end{cases}$$

4. A computer with a monitor viewable program that executes to display a histogram of image data on the monitor, the monitor contemporaneously displaying a screen image viewed on a monitor displaying the histogram, and displays a digital or analog control element that controls both compression and expansion of midtones, wherein activation of the midtone compression/expansion element accordingly alters the displayed image according to effects of programs underlying the control of the element, this histogram display and element being associated on a single logical screen display in which at least one other image data modification effect is present on the screen image as a cursor addressable or keyboard selectable image data modification effect, wherein color channels of the image are processed either individually or by making independent changes to all channels at once and the stretching is accomplished with the algorithm:

$$Y = \begin{cases} Y_{\min}, X < T. \\ Y_{\min} + (Y_{\max} - Y_{\min})(X - T)/(X_{\max} - T). \end{cases}$$

5. A computer with a monitor viewable program that executes to display a histogram of image data on the monitor, the monitor contemporaneously displaying a screen image viewed on a monitor displaying the histogram, and displays a digital or analog control element that controls both compression and expansion of midtones, wherein activation of the midtone compression/expansion element accordingly alters the displayed image according to effects of programs underlying the control of the element, this histogram display and element being associated on a single logical screen display in which at least one other image data modification effect is present on the screen image as a cursor addressable or keyboard selectable image data modification effect, wherein a gamma function is used for contrast adjustment and the gamma function comprises:

$$Y = Y_{max} (X/X_{max})^{1/\gamma}.$$

6. A computer with a monitor viewable program that executes to display a histogram of image data on the monitor, the monitor contemporaneously displaying a screen image viewed on a monitor displaying the histogram, and displays a digital or analog control element that controls both compression and expansion of midtones, wherein activation of the midtone compression/expansion element accordingly alters the displayed image according to effects of programs underlying the control of the element, this histogram display and element being associated on a single logical screen display in which at least one other image data modification effect is present on the screen image as a cursor addressable or keyboard selectable image data modification effect, wherein a tilde function is used for contrast adjustment and the tilde function comprises:

$$Y = Y_{max} \exp\{-b[\ln(X_{max}/X)]^p\}.$$

7. A computer program product storing computer-executable instructions defining a computer process, the computer process comprising:

computing a histogram representing statistics of pixel values associated with pixels in a digital image;

identifying a range of the pixels having pixel values substantially centered about a measure of central tendency of pixel values in the digital image;

detecting a setting of an adjustment control element having at least one setting controlling adjustment of pixel values of the digital image to cause histogram expansion within the range of pixels and having at least one setting controlling adjustment of pixel values of the digital image to cause histogram compression within the range of pixels;

adjusting the pixel values of the pixels within the range to expand or compress the histogram throughout the range, responsive, to the detecting operation;

adjusting the pixel values of the pixels outside both sides of the range to compress or expand the histogram outside of the range and to maintain the measure of central tendency of the pixel values in the digital image, responsive to the detecting operation.

8. The computer program product of claim 7 wherein the computer process further comprises:

displaying the histogram concurrently with the adjustment control element.

9. The computer program product of claim 7 wherein the computer process further comprises:

displaying a modified image exhibiting the adjusted pixel values.

10. The computer program product of claim 7 wherein the computer process further comprises:

displaying a modified histogram exhibiting the adjusted pixel values.

11. The computer program product of claim 9 wherein the computer process further comprises:

displaying a tone reproduction curve reflecting pixel value adjustments of the adjusting operations.

12. The computer program product of claim 11 wherein the tone reproduction curve has a continuous first derivative.

13. The computer program product of claim 11 wherein changes to the setting of the adjustment control element are reflected in the displayed tone reproduction curve.

14. The computer program product of claim 7 wherein the pixel values of pixels within the range represent midtones and the adjustment control element includes a slider control element providing incremental control of midtone expansion and compression.

15. The computer program product of claim 7 wherein the pixel values represent pixel intensities.

16. A method comprising:

computing a histogram representing statistics of pixel values associated with pixels in a digital image;

identifying a range of the pixels having pixel values substantially centered about a measure of central tendency of pixel values in the digital image;

detecting a setting of an adjustment control element having at least one setting controlling adjustment of pixel values of the digital image to cause histogram expansion within the range of pixels and having at least one setting controlling adjustment of pixel values of the digital image to cause histogram compression within the range of pixels;

adjusting the pixel values of the pixels within the range to expand or compress the histogram throughout the range, responsive to the detecting operation;

adjusting the pixel values of the pixels outside both sides of the range to compress or expand the histogram outside of the range and to maintain the measure of central tendency of the pixel values in the digital image, responsive to the detecting operation.

17. The method of claim 16 further comprising:

displaying the histogram concurrently with the adjustment control element.

18. The method of claim 16 further comprising:

displaying a modified image exhibiting the adjusted pixel values.

19. The method of claim 16 further comprising:

displaying a modified histogram exhibiting the adjusted pixel values.

20. The method of claim 16 further comprising:

displaying a tone reproduction curve reflecting pixel value adjustments of the adjusting operations.

21. The method of claim 20 wherein the tone reproduction curve has a continuous first derivative.

22. The method of claim 20 wherein changes to the setting of the adjustment control element are reflected in the displayed tone reproduction curve.

23. The method of claim 16 wherein the pixel values of pixels within the range represent midtones and the adjustment control element includes a slider control element providing incremental control of midtone expansion and compression.

24. The method of claim 16 wherein the pixel values represent pixel intensities.

* * * * *